United States Patent [19]

Ljungstroem

[11] Patent Number: 5,416,372
[45] Date of Patent: May 16, 1995

[54] INDUCTION TYPE MOTION SENSOR

[75] Inventor: Karin Ljungstroem, Stockholm, Switzerland

[73] Assignee: Siemens Elema AB, Solna, Sweden

[21] Appl. No.: 108,453

[22] Filed: Aug. 19, 1993

[30] Foreign Application Priority Data

Aug. 21, 1992 [SE] Sweden .................. 9202401

[51] Int. Cl.6 .................. H02K 11/00; H02K 17/42; G01N 27/72
[52] U.S. Cl. .................. 310/168; 310/68 E; 310/155; 324/239
[58] Field of Search .......... 310/68 R, 68 A, 68 D, 310/68 E, 68 B, 36, 168, 155, 171; 324/239, 207.15, 207.25

[56] References Cited

U.S. PATENT DOCUMENTS

| 2,669,669 | 2/1954 | Spaulding | 310/155 |
| 3,230,407 | 1/1966 | Marsh, Jr. | 310/168 |
| 3,366,874 | 11/1963 | Kühne | 327/207 |
| 3,855,525 | 12/1974 | Bernin | 324/34 D |
| 3,925,734 | 12/1975 | Smith | 331/41 |
| 3,939,416 | 2/1976 | Maskery | 327/174 |
| 3,944,923 | 3/1976 | Luteran | 324/165 |
| 4,008,566 | 2/1977 | McClintock | 58/50 R |
| 4,384,252 | 5/1983 | Kolter | 327/239 |
| 4,644,246 | 2/1987 | Knapen | 320/21 |
| 4,785,242 | 11/1988 | Vaidya et al. | 324/208 |

FOREIGN PATENT DOCUMENTS 8501719 11/1986 Brazil .

Primary Examiner—Thomas M. Dougherty
Assistant Examiner—D. R. Haszko
Attorney, Agent, or Firm—Hill, Steadman & Simpson

[57] ABSTRACT

The sensitivity of an induction-type motion sensor having a magnetic circuit with a permanent magnet to small movements is increased by the use of a stator with a core containing a permanent magnet as a fixed part thereof. An electrical coil is wound around the stator and a pendulum-type rotor has a ferromagnetic moving element which, when the motion sensor is subjected to movement forces, passes in and out of the air gap of the stator, thereby alternating the magnetic field in the stator and inducing a current in the electrical coil.

4 Claims, 1 Drawing Sheet

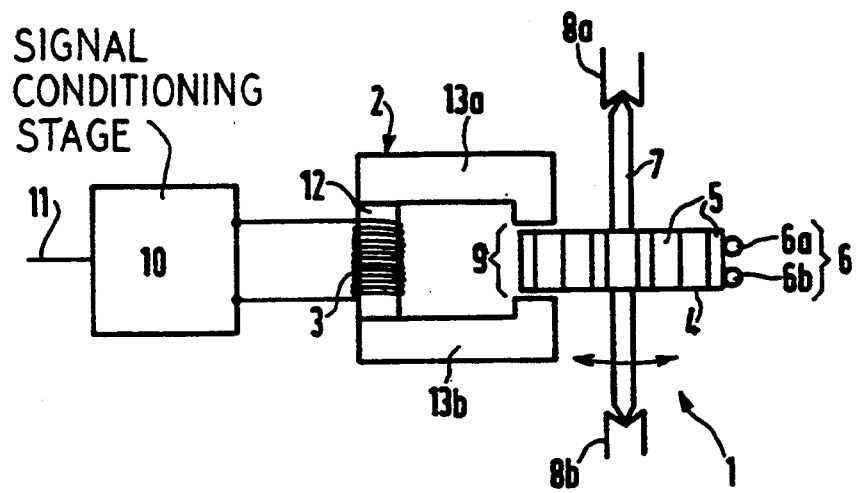
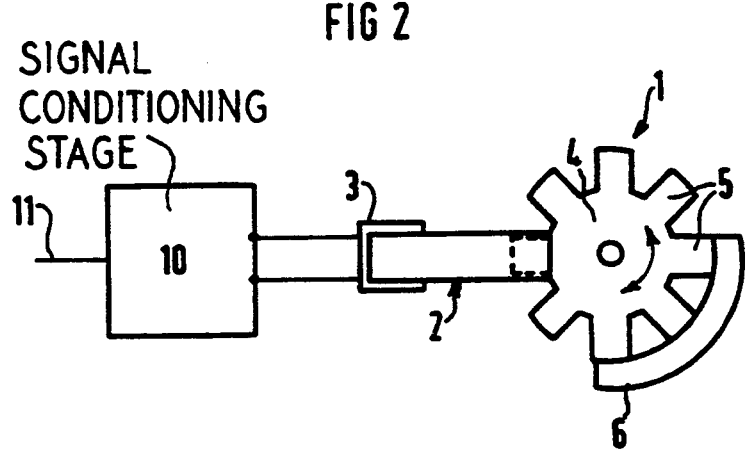

INDUCTION TYPE MOTION SENSOR

BACKGROUND OF THE INVENTION

1. Field of the Invention

The present invention relates to an induction-type motion sensor

2. Description of the Prior Art

Sensors for detecting motion which operate on the principle of relative movement between a conductor and a magnetic field resulting in a current being induced in the conductor are known in the art. Such induction-type sensors generally include a magnetic circuit with a permanent magnet, the magnetic circuit comprising a stator, a rotor and an electrical coil devised around the stator. The rotor is comprising a pendulum arranged to oscillate when the motion sensor is subjected to movement, and a moving element is provided at the stator, at least partially in the stator's air gap. The moving element is connected to the pendulum and, when the element is set in motion by the pendulum, the element acts on the magnetic field in the stator, thereby inducing a current in the electrical coil.

Brazilian Patent No. 8 501 719 describes an inductive power generator with a bipolar permanent magnet as the rotor element, which is rotatable in the air gap of the stator. An electrical coil is provided around the stator. A pendulum oscillates when subjected to movement stress and transfers the movement to the rotor element via a system of gears. The gears cause an upward shift in the number of oscillations of the rotor element in the air gap, compared to the pendulum oscillation, so as to achieve a greater number of alternations in the magnetic field of the stator when the pendulum oscillates. The current generated in the electrical coil in this way is rectified and used for powering a watch.

The induced current changes direction when the magnetic field alternates. A low gearing transmission ratio produces a smaller number of alternations in the magnetic field for a given pendulum travel, whereas a high gearing transmission ratio produces a larger number of alternations in the magnetic field with the same pendulum travel. However, higher gearing transmission ratio also means that heavier movement stress is required to produce the same pendulum travel, i.e., the higher the gearing transmission ratio, the larger the movement force needed to induce the oscillate. In addition, a design employing gears is complex and space-consuming. With a plurality of gears, total friction is greater in the sub-elements of the rotor, and the pendulum, for this reason, is more difficult to set in motion.

An inductive power generator having a magnetic circuit with a permanent magnet, is described in PCT application WO 84/01041. The magnetic circuit includes a stator with an air gap, an electrical coil, and a rotor in the form of a semicircular pendulum disc with a plurality of permanent magnets located so they pass through the air gap when the pendulum oscillates. Increasing the number of magnets on the pendulum disc increases the number of alternations in the magnetic field and accordingly results in a higher frequency for the induced current.

The power generator is designed to generate as much energy as possible from a given movement force and, in particular, to generate energy from large movement forces, since a small swing of the pendulum only produces a limited change in the magnetic field. The version with a plurality of magnets on the pendulum disc means that the magnets must either be made smaller or the pendulum disc must be made larger. Reducing the size of the magnets also reduces their magnetic field strength, thereby reducing the induced current. Moreover, since the pendulum disc only consists of a semicircle, no magnets will be in the air gap for half the rotation cycle when the pendulum oscillates around its oscillation axis.

The above-described generators are designed to transform kinetic energy into electrical energy in an efficient way, but they can also serve as motion sensors, since they emit a specific electrical signal for each movement signal. However, it is important for a motion sensor, intended for use e.g., in an implantable medical apparatus in order to detect body movements, to display high sensitivity to small movements and changes in movement. For example, the motion sensor must be able to emit a signal which differentiates between a patient's normal walking and rapid walking. Sensitivity in an induction-type motion sensor depends on the sensor's ability, on the basis of movement force, to generate an identifiable signal which can be used as a parameter related to movement stress. Alternations in the direction of the induced current comprise one appropriate parameter. The generator according to Brazilian Patent No. 8 501 719 produces a large number of alternations in current direction through high gearing in the system of gears. As noted above, however, high gearing simultaneously demands greater movement force to set the pendulum in motion. Sensitivity to movements is therefore limited to the gearing selected. This can be circumvented with a generator according to PCT application WO 84/01041 in which the number of magnets on the rotor disc produces a large number of alternations in current direction without any system of gears. However, a magnet can become too small to still retain a field strength sufficient to induce a measurable current. Further, more magnets make the peripheral part of the pendulum disc heavier, thereby affecting the disc's natural frequency and the movement force required to set the pendulum in motion, since the inertia of the pendulum disc accordingly increases.

The difficulties in using the known power generators as motion sensors become more pronounced if the sensor is intended for use in an implantable medical apparatus. Space in these apparatuses is limited, and developments are tending to reduce this space even further. Both the system of gears and the pendulum disc with a plurality of magnets are too space-consuming for such applications, and are also too insensitive to small movements if used as motion sensors.

SUMMARY OF THE INVENTION

It is an object of the present invention to provide a motion sensor of the induction type which can be made small but still have a simple, stable construction and be simultaneously capable of detecting small movement forces.

A further object of the invention is to provide such a motion sensor which is usable in implantable medical apparatuses for sensing body movements.

The above objects are achieved in accordance with the principles of the present invention in a motion sensor wherein the permanent magnet is a fixed part of the stator and the moving element is ferromagnetic and is devised so it passes through the air gap when set in motion by the pendulum.

According to the invention, a design with one or more moving permanent magnet(s) is not used. With a fixed, bipolar permanent magnet which is a part, or all, of the stator, a specific magnet flux is present across the air gap. The permanent magnet can be made as large as space permits, since it does not have to move. The ferromagnetic moving element, which induces an alternating current by its passage in and out of the air gap, can be made very small and is designed to produce as many current alternations as possible. This results in a motion sensor which can be made very small and sensitive to small changes in movement. The pendulum's moment of inertia can be directly adapted to the movements to be sensed, since it does not have to be weighted down with extra magnets or gears to increase the number of alternations in the magnetic field.

A further improvement of the motion sensor is achieved in accordance with the invention in an embodiment wherein the moving element is a circular disc with a plurality of radial teeth arranged around its periphery, and the circular disc is devised to oscillate around an axis in such a way that the teeth pass in and out of the air gap.

Movement of the teeth through the air gap has the requisite effect on the magnetic field, thereby inducing current in the electrical coil. The teeth are designed so the induced current exhibits a maximum change even when changes in the position of the teeth are small, e.g., by always passing a tooth through the air gap even in the case of small body movement.

In conjunction with the design of the teeth, it is preferable to devise the air gap with a predetermined cross-section, and to devise the teeth so that their radial cross-section is substantially identical to the cross section of the air gap, to devise and the distance between teeth to be substantially identical to the cross section of the air gap.

This embodiment produces the largest difference in alternation in the magnetic field from a state in which an entire tooth is in the air gap to a state in which no tooth is in the air gap. The size of the air gap's cross-section and, accordingly, of the teeth and the inter-tooth distance, is the only limitation on the minimum movements which can thereby be recorded. For example, the stator can be devised so its cross section diminishes at the air gap, becoming narrow in the direction of travel of the teeth so at least one tooth always passes through the air gap even when the movement force is very small.

A further improvement of the motion sensor is achieved in accordance with the invention in an embodiment wherein a weight is provided on the moving element so the element has an eccentric distribution of mass around the axis, the moving element then serving as the pendulum.

When the pendulum and moving element consist of a single element, the size of the motion sensor can be reduced even further. In particular when the moving element consists of a toothed circular disc, the added weight can advantageously be provided along the periphery over several teeth. The weight will then not prevent alternation of the magnetic field when the weighted teeth pass through the air gap. This is in contrast, for example, to the generator of PCT application WO 84/01041 in which the weights on the semicircular pendulum disc consist of magnets, resulting in a current being induced only during the half of the revolution in which the magnets are in the air gap.

In the use of the motion sensor in an implantable medical apparatus, preferably if the pendulum's natural frequency is made to be between 2 and 8 Hz, preferably 4 Hz.

The human body has a natural frequency of about 4 Hz in normal physical activity. Noise from other sources with a higher frequency, as occurs during car driving or a ride on a bumpy train, will therefore not be recorded by the sensor as body movement.

DESCRIPTION OF THE DRAWINGS

FIG. 1 is a schematic representation of an embodiment of a motion sensor constructed and operating in accordance with the principles of the present invention.

FIG. 2 is a side view of the motion sensor of FIG. 1.

DESCRIPTION OF THE PREFERRED EMBODIMENTS

The motion sensor shown in FIGS. 1 and 2 includes a magnetic circuit containing a stator 2 with an air gap 9 and a rotor 1 which moves in the air gap 9. An electrical coil 3 is wound around the stator 2 and is connected to a signal conditioning stage 10. The stator 2 is magnetic and can consist in whole or part of a permanent magnet or, as shown in FIG. 1, of a permanent magnet 12 and two ferromagnetic pole shoes 13a and 13b which form the air gap 9.

The rotor 1 is in the form of a circular disc 4 with a number of teeth 5 and an eccentric weight 6 to produce a pendulum effect for the rotor 1. The rotor 1 is journaled on a shaft 7 between two bearings 8a and 8b, the rotor 1 oscillating on the axis formed by the shaft 7 when a movement load is imposed. When the rotor 1 oscillates, the teeth 5 move in and out of the air gap 9. The eccentric weight 6, which provides the rotor with an eccentric distribution of mass around the shaft 7, consists of two lead wires 6a and 6b, the mass of the lead wires 6a and 6b being selected to obtain a specific natural frequency for the rotor 1. When it is used, e.g., in a pacemaker or other implantable medical apparatuses to sense body movements, an appropriate natural frequency of about 4 Hz is selected. Most human body movements occur at this frequency. The teeth 5 are devised so that every tooth 5 has an axial surface corresponding to the cross-section of the air gap 9.

When the motion sensor is subjected to a movement force, the rotor 1 begins oscillating around an equilibrium position at the predetermined natural frequency. One or more teeth 5 will then pass in and out of the air gap 9, depending on the magnitude of the movement force. The magnetic field in the air gap 9 will vary, depending on how much of a tooth 5 is in the air gap 9. A current is induced in the electrical coil 3 as a result of variations in the magnetic field in the air gap 9. Thus, the induced current in the electrical coil 3 is directly related to movements around the specific natural frequency, i.e., about 4 Hz, if the motion sensor is to be used to sense body movements. The induced current is supplied to the signal conditioning stage 10 in which movement is determined from the magnitude of the inducted current. The signal conditioning stage 10 then emits a signal, via a line 11, corresponding to the movement. This signal can be used, e.g., for controlling the heartbeat rate of a pacemaker patient by controlling the delivery of stimulation pulses to the heart.

Although modifications and changes may be suggested by those skilled in the art, it is the intention of the inventor to embody within the patent warranted hereon all changes and modifications as reasonably and properly come within the scope of the inventor's contribution to the art.

I claim as my invention:

1. A motion sensor comprising:
    a stator having a permanent magnet as a fixed part thereof, said stator having an air gap;
    an electrical coil wound around said stator; and
    a pendulum freely rotatable around an axis and having an eccentric mass distribution relative to said axis for freely oscillating in response to a movement force, said pendulum having a plurality of ferromagnetic teeth at a periphery thereof disposed to move through said air gap, and thereby induce current in said coil, upon oscillation of said pendulum.

2. A motion sensor as claimed in claim 1 wherein said air gap has a cross-section, wherein said teeth have a radial cross-section substantially identical to the cross-section of said air gap, and wherein said teeth have a distance therebetween substantially identical to said cross-section of said air gap.

3. A motion sensor as claimed in claim 1 wherein said pendulum has a natural frequency between 2 and 8 Hz.

4. A motion sensor as claimed in claim 3 wherein said pendulum has a natural frequency of 4 Hz.

* * * * *